United States Patent Office 2,759,911
Patented Aug. 21, 1956

2,759,911

**AMINE ADDITION TO BUTADIENE AND ACRYLO-
NITRILE POLYMERIZATION**

Harry Leverne Williams, Sarnia, Ontario, Canada, and
James William Lynn Fordham, Springfield, Mass., assignors to Polymer Corporation Limited, Sarnia, Ontario, Canada, a corporation of Canada No Drawing. Application September 24, 1952,
Serial No. 311,322

Claims priority, application Canada April 24, 1952

3 Claims. (Cl. 260—83.1)

This invention relates to improvements in the emulsion polymerization of butadiene-1,3 and acrylonitrile. More particularly it relates to the addition of an amine or cyanoethylated amine to a persulfate initiated butadiene acrylonitrile reaction.

Butadiene-acrylonitrile reactions are conventionally carried out at temperatures of 85° F. and higher. Generally the recipe involves 100 parts of monomer, about 200 parts of aqueous solution containing approximately 2% emulsifier, 0.3 part of a persulfate catalyst and 0.7 part of a modifier. All parts are by weight. A wide range of variations is employed in the recipe to influence the properties of the product, but these are not significant for the present purposes. While monomer ratios may be varied through an appreciable range, a 64:36 butadiene-acrylonitrile ratio may be said to be representative.

In reactions of the type referred to in the preceding paragraph the conversion which is achieved varies considerably. This variation gives rise to a lack of uniformity in both operations and product. In addition the low yields which are frequently obtained increase the cost of the product.

We have found that these variations in yield are due to the presence or absence in commercial acrylonitrile of certain cyanoethylated amines and in particular due to the occurrence in commercial acrylonitrile of varying amounts of beta-dimethylaminopropionitrile, which is the product obtained by the cyanoethylation of dimethylamine. A small amount of this substance acts as an activator to promote the polymerization of the butadiene-acrylonitrile monomers. Frequently the acrylonitrile is deficient in this substance and as a consequence the conversion is low.

One aspect of the present invention comprises therefore the addition of a small amount of a substance such as beta-dimethylaminopropionitrile to recipes deficient in naturally occurring beta-dimethylaminopropionitrile so as to insure uniformity of conversion.

We have investigated the effect on the conversion of the addition of a large number of cyanoethylated amines at a temperature which is relatively low in comparison with the reaction temperatures normally used. We have found that with a few exceptions every amine tested gave an improvement in conversion in comparison with a check containing no addition of amine activator. The class of amines which are found to be effective for this purpose may be defined as falling within the group comprising compounds of the formulae, $RNHR_1$ where R and $R_1$ are selected from the group comprising H, $CH_3$, $CH_3CH_2$, $CH_3CH_2CH_2$, $CH_3(CH_2)_nOH$, $$(CH_2-CH_2-NH)_nH$$

where $n$ is a number not greated than 2;

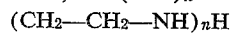
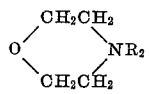

where $R_2$ is selected from the group comprising H and $CH_2CH_2NH_2$.

An alternative definition of the amines which have been found to be effective is that they fall within the class comprising short chained alkyl and dialkyl amines, unsubstituted, alkyl, aminoalkyl and dialkyl ethanolamines, polyethylene polyamines, piperidine, morpholine and aminoalkylmorpholine.

Preferably the amine is used in the cyanoethylated form, but if used in the form of the amine cyanoethylation will occur due to the presence of acrylonitrile in the reaction mixture.

We also found that certain of the cyanoethylated amines which were tested gave higher yields than an equivalent quantity of the naturally occurring cyanoethylated derivative of dimethylamine. Thus the use of a cyanoethylated derivative of methylamine resulted in a conversion which was nearly double that obtained using the derivative of dimethylamine. As the comparative test was carried out with one millimole of activator in each case there was also an improvement over dimethylamine in the weight of methylamine required. High conversions were also obtained with diethanolamine, methylethanolamine and ethylethanolamine. Conversions comparable to or slightly better than that obtained with the dimethylamine derivative were obtained with ethylamine, diethylamine, diethylene triamine, triethylenetetramine, di-iso-propanolamine, 2-aminoethylethanolamine, morpholine and aminoethylmorpholine.

Example I illustrates the improvement achieved by the addition of beta-dimethylaminopropionitrile to a polymerization mixture low in natural activator.

EXAMPLE I

Two charges were prepared in accordance with the following recipe. In each case the acrylonitrile employed was one believed to be low in natural activator.

|  | A | B |
|---|---|---|
| Butadiene parts | 64 | 64 |
| Acrylonitrile do | 36 | 36 |
| Water do | 200 | 200 |
| Emulsifier [1] do | 3.6 | 3.6 |
| Potassium Hydroxide do | 0.1 | 0.1 |
| Modifier (mixed Tertiary Mercaptans) do | 0.5 | 0.5 |
| Potassium persulfate do | 0.27 | 0.27 |
| Beta-dimethylaminopropionitrile, per 100 parts of acrylonitrile | Nil | 0.02 |
| Conversion 13 hours at 86° F percent | 18 | 72 |

[1] Mixed alkyl aryl sulfonate and condensed naphthalene sulfate.

While the foregoing example shows that a satisfactory conversion can be achieved at 86° F. by insuring the presence of a small quantity of the cyanoethylated derivative of dimethylamine, it will be apparent from Example II if it is desired to carry out the reaction at a lower temperature between 32° F. and 60° F. such as 55° F. the conversion will be too low for practical commercial utilization, even with the addition of the dimethylamine derivative. Example II, however, also shows that there are other cyanoethylated amines which are effective to give a satisfactory rate of conversion even at the reduced temperature.

EXAMPLE II

Various charges were prepared and reacted for 17 hours at 55° F. In each case the charge conformed to the following recipe:

|  | A | B |
|---|---|---|
|  | Parts | Parts |
| Butadiene | 64 | 64 |
| Acrylonitrile | 36 | 36 |
| Water | 250 | 250 |
| Emulsifier (as in Example I) | 3.6 | 3.6 |
| Potassium Hydroxide | 0.1 | 0.1 |
| Modifier (mixed tertiary mercaptans) | 0.5 | 0.5 |
| Potassium persulfate | 0.27 | 0.27 |

To each such charge was added one millimole of activator prepared by allowing the indicated amine to react with an equal quantity of acrylonitrile. A and B represent samples prepared in the same manner though some variation in the conversion achived does occur. Table I sets out the results achieved.

*Table I*

| Amine | Percent Conversion | |
|---|---|---|
| None | 4.3 | 6.0 |
| Ammonia | 6.0 | 6.9 |
| Hydrazine | 12.8 | 15.8 |
| Hydroxylamine | 0.0 | 0.0 |
| Methylamine | 55.0 | 63.3 |
| Ethylamine | 30.6 | 30.9 |
| n-Propylamine | 11.2 | 16.4 |
| iso-Propylamine | 15.7 | 17.6 |
| n-Butylamine | 7.9 | 8.2 |
| sec.-Butylamine | 6.1 | 6.1 |
| Dimethylamine | 30.3 | 32.8 |
| Diethylamine | 28.00 | 28.6 |
| Di-n-propylamine | 6.5 | 12.5 |
| Di-iso-propylamine | 5.8 | 6.7 |
| Di-n-butylamine | 3.4 | 4.1 |
| Di-sec.-butylamine | 8.2 | 11.5 |
| Di-n-hexylamine | 8.2 | 8.8 |
| Ethylenediamine | 22.5 | 22.6 |
| 1,2-Diaminopropane | 16.6 | 17.8 |
| Diethylenetriamine | 47.0 | 47.1 |
| Triethylenetetramine | 35.9 | 36.9 |
| Tetraethylenepentamine | 10.2 | 25.3 |
| Polyethyleneamine 1000 | 13.1 | 14.4 |
| Ethanolamine | 19.0 | 25.7 |
| Diethanolamine | 61.1 | 61.3 |
| Di-iso-propanolamine | 27.8 | 29.4 |
| Methylethanolamine | 74.9 | 76.6 |
| Ethylethanolamine | 65.5 | 66.5 |
| 2-Aminoethylethanolamine | 31.8 | 33.3 |
| Phenylethanolamine | 1.9 | 1.9 |
| Cyclohexylamine | 9.0 | 11.7 |
| Piperidine | 13.0 | 15.2 |
| Morpholine | 27.5 | 29.0 |
| Aminoethylmorpholine | 40.6 | 43.4 |

Dimethylamine, which on cyanoethylenization becomes beta-dimethylamino-propionitrile, serves as a control to indicate (a) the extent of reduction in conversion resulting from temperature reductions and (b) the greater efficiency of other reaction products formed when acrylonitrile reacts with amines other than those known to occur naturally. While the molecular configuration of the propionitrile reaction product of equimolar proportions of dimethylamine with acrylonitrile is known, the final structure of the product of a similar reaction between more complex amines and acrylonitrile is uncertain. Since the residual amine groups no doubt react with acrylonitrile in the recipe, it is theorized that they behave as a series of dialkylamines joined together.

We claim:

1. A process for the emulsion polymerization of butadiene and acrylonitrile with a water soluble persulfate catalyst in which there is added prior to polymerization about one millimole of methylethanolamine for each hundred parts of monomers and in which the polymerization is carried out at a temperature of about 55° F.

2. A process for the emulsion polymerization of butadiene and acrylonitrile with a water soluble persulfate catalyst in which there is added prior to polymerization about one millimole of methylethanolamine for each hundred parts of monomers and in which the polymerization is carried out at a temperature of between 32° F. and 60° F.

3. A process for the emulsion polymerization of butadiene and acrylonitrile with a water soluble persulfate catalyst and in the presence of an emulsifier which is free from fatty acids in which there is added prior to polymerization about one millimole of methylethanolamine for each hundred parts of monomers, and in which the polymerization is carried out at a temperature of 32° F. to 60° F.

References Cited in the file of this patent

UNITED STATES PATENTS

| 2,529,315 | Serniuk | Nov. 7, 1950 |
| 2,630,426 | Uraneck et al. | Mar. 3, 1953 |